March 12, 1946. D. FIRTH 2,396,414
MOUNTING FOR PULLEYS, ETC
Filed Oct. 11, 1943 2 Sheets-Sheet 2
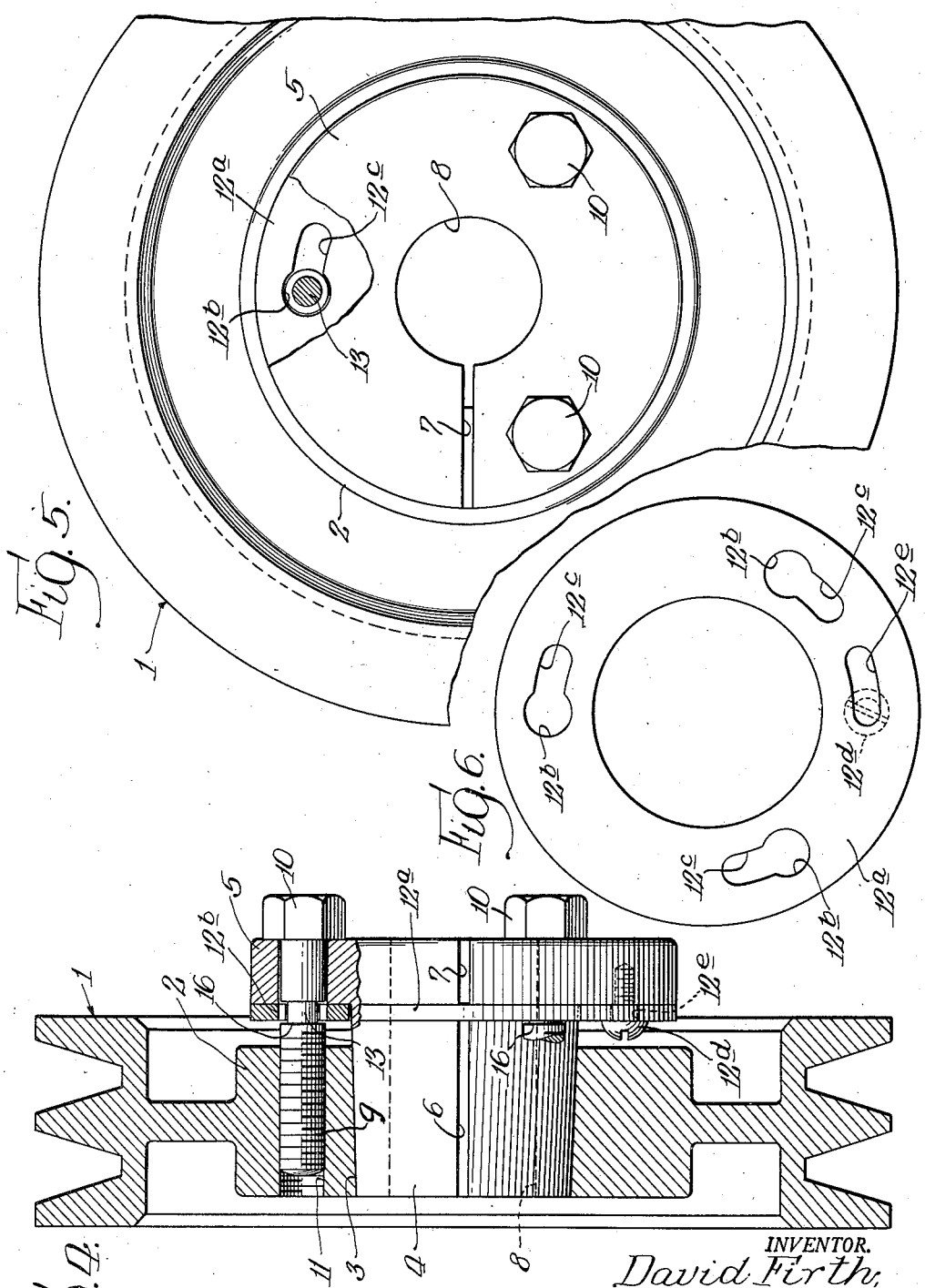
INVENTOR.
David Firth,
BY
Osgood H. Dowell
Atty Patented Mar. 12, 1946

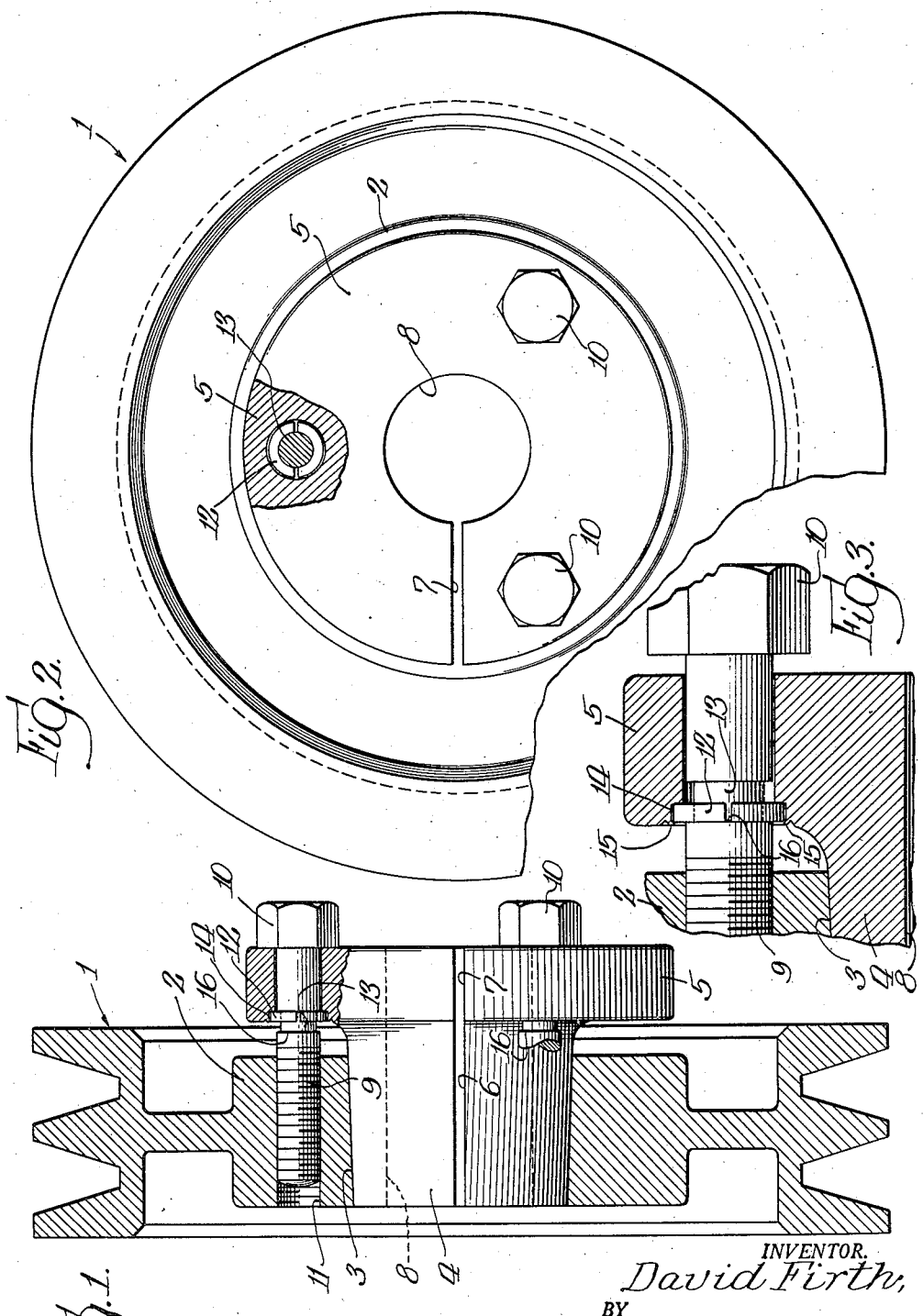

2,396,414

UNITED STATES PATENT OFFICE 2,396,414

MOUNTING FOR PULLEYS, ETC.

David Firth, South Bend, Ind., assignor to Dodge Manufacturing Corporation, Mishawaka, Ind., a corporation of Indiana Application October 11, 1943, Serial No. 505,772

16 Claims. (Cl. 287—52.06)

This invention has to do with the mounting on shafts of pulleys and other machine elements.

An object of the invention is to provide a pulley which can be slipped over a shaft and fastened thereto by means including a tapered contractible bushing fitted in a tapered bore of the pulley hub, the construction being of such character as to give, with the usual advantages of an adapter sleeve mounting, ease of installation of the pulley on the shaft and quick demountability thereof. While this statement is made with reference to pulleys, the invention is also more generally applicable to the mounting on shafts of various machine elements including gear wheels, eccentrics, cams, bearings, etc.

Incidental to the object above stated is the provision of a structure of the adapter sleeve mounted type which can be positively released from gripping connection with the shaft by actuation in a retractive direction of the means for forcing the tapered bushing or adapter sleeve to wedging relation to the shaft and pulley hub, thus permitting demounting of the pulley without the necessity after loosening said means of striking on the small end of said bushing to force it from said relationship, and avoiding the objections, extra trouble, delay and liability of injuring the bushing which are incident to such striking. Further the invention aims to provide a simple and practicable structure having the advantageous capability last mentioned and giving auxiliary advantages.

The invention will be described with reference to an illustrative embodiment thereof shown in the accompanying drawings, and will be more particularly pointed out and defined in the claims hereto appended.

In said drawings:

Fig. 1 is a longitudinal sectional view of the illustrative structure, showing the tapered bushing or adapter sleeve thereof in side elevation.

Fig. 2 is an end elevation of said structure, looking toward the right hand end of Fig. 1.

Fig. 3 is an enlargement of a fragment of Fig. 1, showing the parts in relationship for initiating positive action to release the pulley from gripping connection with the shaft.

Figs. 4 and 5 are longitudinal sectional and end views of another embodiment of the invention.

Fig. 6 is an end view of a collar embodied in the structure of Figs. 4 and 5.

A machine element mountable on a shaft is represented in the drawings by a pulley 1, shown as a sheave of a form for use in a V-belt drive. The pulley hub 2 has a tapered bore 3 in which is fitted an exteriorly tapered contractible bushing 4, preferably of steel or the like, having on its larger end and integral therewith a flange 5, the bushing being split from end to end by a longitudinal slot 6 extending through said flange as indicated at 7. The bushing has a straight or untapered shaft bore 8 and is contractible on a shaft (not shown) by forcing the hub and bushing to axial relationship to wedge the bushing between the shaft and hub. This action is accomplished by the tightening of screws 9 parallel to the pulley axis and connecting the bushing flange 5 to the hub 2. As it is desirable to apply forces for wedging the bushing at appropriately distributed points about the shaft bore, there are shown in this instance three screws 9 arranged equal angular distances apart; though it will be understood that the principle of the invention is not dependant upon the number or spacing of such screws. While there might be used, for example, two such screws arranged at diametrically opposite sides of the shaft bore, three or more such screws suitably spaced are better, three being preferred in the case of pulleys of moderate size.

By operating the screws 9 reversely or retractively, i. e. in the direction in which they are loosened, the pulley hub 2 and bushing 4 can be positively forced from the axial relationship aforesaid to relationship to release the bushing from gripping engagement with the shaft and hub and to allow the bushing to expand within the hub. By means presently to be described, this is advantageously accomplished in the illustrative construction without threaded engagement of the screws with the bushing, thus avoiding liability of binding of screws. As shown, the screws 9 have enlarged heads 10 and screw-threaded shanks, the bushing flange 5 being between the hub and screw heads, and the shanks of the screws passing loosely through holes therefor in the bushing flange and engaging the threads of screw holes 11 in the hub. The screw heads 10 may be of any appropriate configuration for engagement by a wrench for operating them. As the screws can transmit force through the screw heads 10 only in one direction, supplemental means are provided for transmitting screw thrust in the opposite direction to the bushing, said means being represented in the illustrative construction by metal rings 12 arranged in annular grooves in the screws and in abutting relation to the bushing flange 5. To permit assembly of said rings around the reduced portions 13 of the screws, the rings may be formed by complemental semicircular members or segments, as shown in Fig. 2, and may be held together and in cooperative relation to the screws and bushing flange 5 by seating them in circular recesses 14 in the front or inner face of said flange and retaining them therein by peening the metal of said flange over or around the edges of said rings, as indicated at 15 in Fig. 3. Preferably the screws are arranged so that when the bushing 4 in unstressed and expanded state fits closely in the tapered bore of the pulley hub, the screw heads are closely adjacent to or in contact or nearly contacting with the bushing flange, so that the bushing can be quickly contracted and wedged between the shaft and hub by tightening the screws. The annular grooves in the screws in which the rings 12 are arranged and so located that no thrust is imposed on said rings by the screws as they are tightened. In other words no thrust is imposed against the rings 12 in a direction to displace them from the recesses 14 in which they are seated in abutting relation to the bushing flange.

Assuming the tapered bushing 4 to have been forced into wedging relation to the shaft and hub by the tightening of the screws, then upon reverse actuation of said screws the shoulders 16 thereof coming against the rings 12 will jam them against the bushing flange, so that by further operation of the screws in the direction in which they are loosened the hub and bushing will be forced to axial relationship to release the bushing and to allow it to expand. By forming the annular grooves in the screws of greater width or axial extent than the thickness of the rings 12, there may be allowed a limited axial movement of the screws relative to the bushing, determined by the axial extent of said grooves, so that when the screw heads bear against the bushing flange 5 the shoulders 16 of the screws are somewhat spaced from the rings 12, as is advantageous and desirable to allow the screws to be loosened easily or without the great resistance to unscrewing that would be imposed if they were immovable axially relative to the tightly wedged bushing, and to enable them the more effectively to force the bushing longitudinally relative to the hub in the direction for loosening it from the hub and shaft after the screws have been sufficiently loosened and the bushing has been freed from their holding effect. Thus the screws 9 connect the hub and bushing through threaded connection with one of them and lost motion connections with the other, whereby tightening the screws wedges the bushing, and the tightened screws can be loosened without resistance other than by frictional resistance of interengaging screw threads, and, after loosening the screws, further operation thereof in the direction in which they are loosened effects release of the bushing so as to enable the hub and bushing in unit assembly to be slipped off from the shaft.

In lieu of the rings or collars 12 respectively associated with the individual screws, in a construction such as hereinbefore described, there may be substituted in an otherwise similar construction, as shown in Figs. 4 to 6, a single collar 12a through which the several screws pass; said collar 12a having keyhole-like openings providing holes or hole portions 12b of large enough diameter for passage of the screws and arcuate slots 12c extending therefrom, the collar or portions thereof having such openings being of less width than the annular grooves of said screws, so that by turning the collar the slotted portions thereof can be lodged within said grooves with the reduced portions 13 of the screws received in said arcuate slots 12c. This gives an advantage in that in assembling the screws can be inserted after the tapered bushing is in place in the hub, and in disassembling the screws can be extracted before withdrawing the bushing from the hub. Consequently in furnishing such bushings for use in embodiments of the invention such as exemplified in Figs. 4 to 6 it is unnecessary to furnish screws in assembly therewith. In assembling, assuming the bushing 4 to have been inserted through the collar 12a and fitted in the sheave hub, the screws are then inserted through the bushing flange 5 and collar and screwed into the hub; and, when the parts are brought to a proper or desired relationship, (e. g. with the bushing in unstressed or expanded state fitting the hub bore and the screw heads 10 abutting or nearly in contact with the bushing flange), the collar 12a is turned to bring the arcuate slots 12c within the annular grooves of the screws and over their reduced portions 13. The collar 12a is then in cooperative relationship with the screws and bushing flange 5 to transmit to the latter thrust of the screws on reverse rotation thereof, and functions in the same manner as the rings or collars 12 individually associated with the screws in the otherwise similar construction shown in Figs. 1 to 3. By virtue of the greater width of the annular grooves of the screws than that of the collar, and appropriate location of such grooves relative to the screw heads 10, the same advantageous effects are obtainable as in the first described construction; that is to say, tightening the screws wedges the bushing between a shaft and the hub, and the screws can be loosened easily, and by further operation in the unscrewing direction will effect release of the bushing from gripping coaction with the shaft and hub. To prevent accidental turning of the collar 12a in a direction to register the larger portions of their keyhole-like openings with the screws, there may be employed a shouldered screw 12d extending through an arcuate slot 12e in the collar and screwed into the bushing, the head or shoulder of said screw 12d bearing against said collar, which is thereby clamped or held to the flange 5 of the bushing. In disassembling, upon loosening the screw 12d, the collar is turned to bring the holes 12b into registration with the screws, which are then unscrewed and withdrawn, permitting removal of the sheave from the bushing.

As will be apparent, the invention obtains, with the usual advantages of an adapter type mounting, capabilities of practical advantage in installation and demounting. A pulley embodying the invention, having its contractible hub bushing secured therein by its operating screws, can be applied as a unit to a shaft of appropriate diameter by slipping it thereon and fastening it thereto by tightening said screws, and demounted by sufficiently loosening or partially unscrewing said screws and slipping off the released unit from the shaft. Thus the pulley is both mountable and demountable as easily and quickly as a slip-fitted pulley fastened by set screws, with the great advantages over the latter that the pulley embodying the invention can be applied to a shaft of any diameter within a certain range of diameters and that the screws when tightened exert no radial thrust but force the tapered bushing into tight wedging and gripping relation to the shaft and hub, giving a highly effectual fastening with no misalignment or impairment of concentricity of the interfitted parts. Further, the several features of the invention embodied in the illustrative constructions give a simple and highly practicable device for the general purposes of the invention, with auxiliary or subsidiary advantages as hereinbefore indicated.

The invention is applicable to the mounting of devices such, for example, as anti-friction bearings comprising concentric inner and outer bearing rings and interposed balls or rollers in self-retained assemblies or in unit assemblies with housings, such devices or units having their central portions rotatable within their outer portions, or their outer portions mounted on and rotatable about their inner portions.

The term "shaft-mountable unit" is adopted as a generic term for a device comprising or having a hub and mounting means in unit assembly therewith through which it is mountable on a shaft, whether the device be a pulley or other ordinary machine element or an antifriction bearing or other unit assembly of elements. In the case of an antifriction bearing, the inner bearing ring thereof, or an inner tubular or annular member on which the bearing ring is shrunk or otherwise affixed, may be regarded as the hub, the term "hub" being used in the following claims in a broad sense as inclusive of the hub of a pulley or other machine element, or any tubular or annular or bored element to be mounted on a shaft, or the central member of an antifriction or other bearing or other unit assembly the central and outer portions of which are relatively rotatable or otherwise relatively movable or adjustable.

While the forms of embodiment of the invention herein disclosed constitute preferred forms, that of Figs. 4 to 6 involving in a construction generally similar to the first a specific means of special advantage in connection with assembling and disassembling such a construction, it will be understood that other forms of embodiment of the invention than those herein disclosed might be adopted, all coming within the scope of the claims which follow.

I claim:

1. A shaft-mountable unit having a hub with a tapered bore in unit assembly with mounting means therefor comprising a tapered split contractible bushing fitting said bore and screw means parallel to the axis of the unit connecting said hub and bushing and by tightening and reverse operation of which the hub and bushing are forcible to and from axial relationship to wedge the bushing between the hub and a shaft, said screw means being in threaded connection with only one of said hub and bushing and coactive with the other on screwing up operation and there being means for transmitting force to said other from said screw means on reverse operation thereof, there being lost motion provision whereby transmission of force to said other on reverse operation of said screw means is deferred until a sufficient unscrewing thereof to loosen said screw means; the said unit being mountable as such by slipping it on a shaft and tightening said screw means, and quickly demountable by reversely operating said screw means sufficiently to release or loosen the bushing and slipping the released unit off from the shaft.

2. A hub mounting comprising, in combination with a hub having a tapered bore, a tapered split contractible bushing fitting said bore, and screw means connecting said hub and bushing and by tightening and reverse operation of which the hub and bushing are forcible to and from axial relationship to wedge the bushing between a shaft and the hub, said screw means being in threaded connection with only one of said hub and bushing and coactive with the other for forcing them to said relationship, and force-transmitting means through which said screw means on reverse operation can coact with said other to force them from said relationship.

3. A hub mounting comprising, in combination with a hub having a tapered bore, a tapered split contractible bushing fitting said bore, screw means in threaded connection with one of said hub and bushing and coactive with the other for forcing them to axial relationship to wedge the bushing between a shaft and the hub, and means for transferring force to said other from said screw means on reverse operation thereof arranged to be effective for force transmission only after a sufficient reverse operation to loosen the screw means, whereby the screw means can be loosened without resistance other than by frictional engagement of interengaging screw threads and by further reverse operation can force the hub and bushing from said relationship.

4. A hub mounting comprising, in combination with a hub having a tapered bore, a tapered split contractible bushing fitting said bore, and screws parallel to the hub axis in threaded connection with one of said hub and bushing and swivel-connected to the other for transmitting force thereto in either longitudinal direction in which the screws are operated, the swivel connections with said other permitting limited longitudinal movement of said screws relative to said other, whereby the bushing can be wedged between a shaft and the hub by tightening said screws and, after such tightening, the screws can be loosened without resistance other than by frictional engagement of interengaging screw threads and by further unscrewing can force the hub and bushing to axial relationship to release the bushing from its gripping engagement with the shaft and hub.

5. A hub mounting comprising, in combination with a hub having a tapered bore, a tapered split contractible bushing fitting said bore, and screws parallel to the hub axis connecting the hub and bushing and by tightening and reverse operation of which the hub and bushing are forcible to and from axial relationship to wedge the bushing between a shaft and the hub, said bushing having flange means on its larger end confronting and spaced from the adjacent end of the hub, said screws being in threaded connection with one of said hub and flange means and swivel-connected to the other for operation as pull screws, and means coactive with said other and said screws on reverse operation thereof whereby they can act as push screws.

6. A hub mounting comprising, in combination with a hub having a tapered bore, a tapered split contractible bushing fitting said bore and having flange means on its larger end confronting and spaced from the adjacent end of the hub, screws parallel to the hub axis in screw-threaded connection with one of said hub and flange means and passing loosely through the other and having heads in abutting relation to the back or outer side of said other, said screws having annular grooves adjacent to said other, and means engaging said grooves in abutting relation to the inner side of said other for transmitting thereto thrust of said screws on reverse operation thereof.

7. A hub mounting comprising, in combination with a hub having a tapered bore, a tapered split contractible bushing fitting said bore and having flange means on its larger end and confronting and spaced from the adjacent end of the hub, screws parallel to the hub axis in threaded engagement with one of said hub and flange means and passing loosely through the other and having heads in abutting relation to the back or outer face of said other, said screws having annular grooves adjacent to said other, and thrust-transmitting means in engagement with said grooves and in abutting relation to the inner face of said other, said grooves and thrust-transmitting means being arranged in relation to said heads to allow limited longitudinal movement of said screws relative to said other.

8. A hub mounting comprising, in combination with a hub having a tapered bore, a tapered split contractible bushing fitting said bore and having flange means on its larger end confronting and spaced from the adjacent end of the hub, screws parallel to the hub axis passing loosely through said flange means and having screw-threaded connections with the hub and having heads for abutting against the back or outer face of said flange means, and means whereby to transmit to said flange means thrust of said screws in the opposite direction to that in which they are tightened.

9. A hub mounting comprising, in combination with a hub having a tapered bore, a tapered split contractible bushing fitting said bore and having flange means on its larger end confronting and spaced from the adjacent end of the hub, screws parallel to the hub axis passing loosely through said flange means and having screw-threaded connections with the hub and having heads for abutting against the back or outer face of said flange means, said screws having annular grooves and rings or collars arranged in said grooves in abutting relation to the front or inner face of said flange means for transmitting thereto thrust of said screws on reverse operation thereof.

10. A hub mounting comprising, in combination with a hub having a tapered bore, a tapered split contractible bushing fitting said bore and having flange means on its larger end confronting and spaced from the adjacent end of the hub, screws parallel to the hub axis passing loosely through said flange means and having screw-threaded connections with the hub and having heads for abutting against the back or outer face of said flange means, said screws having annular grooves, and rings or collars arranged in said grooves in abutting relation to the front or inner face of said flange means for transmitting thereto thrust of said screws on reverse operation thereof, there being circular recesses in said front or inner face of said flange means, said rings each comprising complemental semi-circular segments and being fitted and retained in said circular recesses in said flange means, and said annular grooves in said screws being of greater width or axial extent than the thickness of said rings and so located that in tightening the screws no thrust is imposed on the rings in a direction to displace them from said recesses, and when the screw heads are jammed against said flange means of the bushing the screw shoulders formed by the groove walls more remote from said heads are spaced from said rings.

11. A hub mounting comprising, in combination with a hub having a tapered bore, a tapered split contractible bushing fitting said bore and having flange means on its larger end confronting and spaced from the adjacent end of the hub, screws parallel to the hub axis connecting said hub and flange means through screw-threaded connections with one of them and passing loosely through the other and having heads for abutting against the outer face of said other, said screws having annular grooves, and thrust-transmitting rings or collars arranged in said annular grooves in said screws for abutting against the inner face of said other, there being circular recesses in said inner face of said other, said rings each comprising complemental semi-circular segments and being fitted and retained in said circular recesses, said annular grooves in said screws being of greater width or axial extent than the thickness of said rings and so located that in tightening said screws no thrust is imposed on the rings and when said screw heads are jammed against said outer face of said other the screw shoulders formed by the groove walls more remote from said heads are spaced from said rings.

12. A hub mounting comprising, in combination with a hub having a tapered bore, a tapered split contractible bushing fitting said bore, a member on said bushing confronting an end face of said hub, screws parallel to the hub axis connecting said hub and member and by tightening and reverse operation of which they are relatively movable axially toward and from each other, said screws being in threaded connection with one of said hub and member and swivel-connected to the other for transmitting force thereto in either longitudinal direction in which the screws are operated, said member being connected to said bushing for transmitting thereto longitudinal force in either direction, and there being lost motion provision in the connections between said screws and bushing whereby after tightening said screws to wedge the bushing between a shaft and the hub the screws can be loosened without great resistance and by further reverse operation can force the bushing and hub to axial relationship to release the bushing from gripping engagement with the shaft and hub.

13. A hub mounting comprising, in combination with a hub having a tapered bore, a tapered split contractible bushing fitting said bore and having flange means on its larger end confronting and spaced from the adjacent end of the hub, screws parallel to the hub axis passing loosely through said flange means and having screw-threaded connections with the hub and having heads for abutting against the back or outer face of said flange means, and a thrust-transmitting collar encircling said bushing between said hub and flange means and having keyhole-like holes including larger portions through which the screws pass loosely and arcuate slots extending from said larger portions, said screws having annular grooves and said collar being arranged in said grooves and adapted to be turned to bring its slotted portions within said grooves with the reduced portions of the screws in said slots.

14. A hub mounting comprising, in combination with a hub having a tapered bore, a tapered split contractible bushing fitting said bore, and operable means connected with said hub and bushing and by operation of which one way they can be forced to axial relationship to wedge the bushing between a shaft and the hub and by operation of which another way they can be forced from said relationship so as to release the bushing from the shaft and to permit the hub in unit assembly with the bushing to be slipped off from the shaft.

15. A hub mounting comprising, in combination with a hub having a tapered bore, a tapered split contractible bushing fitting said bore, operable means for forcing said hub and bushing to axial relationship to wedge the bushing between a shaft and the hub, and means coactive with said forcing means and bushing for forcing the hub and bushing from said relationship by reverse operation of said forcing means.

16. A hub mounting comprising, in combination with a hub having a tapered bore, a tapered split contractible bushing fitting said bore and having flange means on its larger end confronting and spaced from the adjacent end of the hub, screws parallel to the hub axis in threaded connection with one of said hub and flange means and swivel-connected to the other for operation as pull screws, and means whereby said screws on reverse operation can operate as push screws comprising a thrust-transmitting collar between said one and other, said collar having keyhole-like holes including larger portions through which the screws pass loosely and arcuate slots extending from said larger portions, there being annular grooves in said screws, and said collar being arranged in said grooves and adapted to be turned to bring its slotted portions within said grooves with the reduced portions of the screws in said slots.

DAVID FIRTH.